United States Patent [19]

Baker et al.

[11] Patent Number: 4,796,841

[45] Date of Patent: Jan. 10, 1989

[54] FABRIC REINFORCED RUBBER PRODUCT HAVING MOLDED ISOLATOR BUSHINGS

[75] Inventors: Louis Baker, Mishawaka, Ind.; Gerald W. Holland, Matthews, N.C.

[73] Assignee: Baker Rubber, Inc., South Bend, Ind.

[21] Appl. No.: 653,332

[22] Filed: Sep. 24, 1984

[51] Int. Cl.$^4$ ............................................. F16L 3/00
[52] U.S. Cl. .................................................. 248/60
[58] Field of Search ................ 248/60, 58, 62, 65, 248/59, 74.1, 56; 16/2, 109; 29/285, 237, 444; 384/276

[56] References Cited

U.S. PATENT DOCUMENTS

| | | | |
|---|---|---|---|
| 1,297,142 | 3/1919 | Gibbons | 384/276 |
| 1,911,866 | 5/1933 | Wylie | 384/276 |
| 2,690,470 | 9/1954 | Moorhead | 16/2 |
| 3,144,695 | 8/1964 | Budwig | 248/60 |
| 3,270,992 | 9/1966 | Cassel | 248/60 |
| 4,116,411 | 9/1978 | Masuda | 248/60 |
| 4,309,019 | 1/1982 | Bloom | 248/60 |
| 4,318,518 | 3/1982 | Davis | 248/60 |
| 4,465,252 | 8/1984 | Donovan et al. | 248/60 |

Primary Examiner—Ramon O. Ramirez
Attorney, Agent, or Firm—John F. Hoffman

[57] ABSTRACT

A hanger assembly which includes a body formed of fiber-reinforced elastomeric material and one or more isolator bushings formed of molded elastomeric material and removably fitted in an opening of the hanger body.

2 Claims, 2 Drawing Sheets

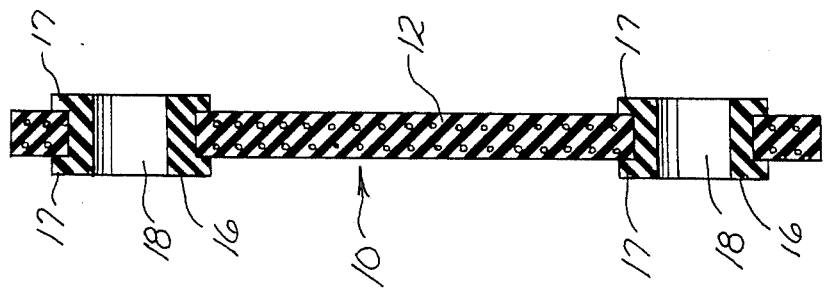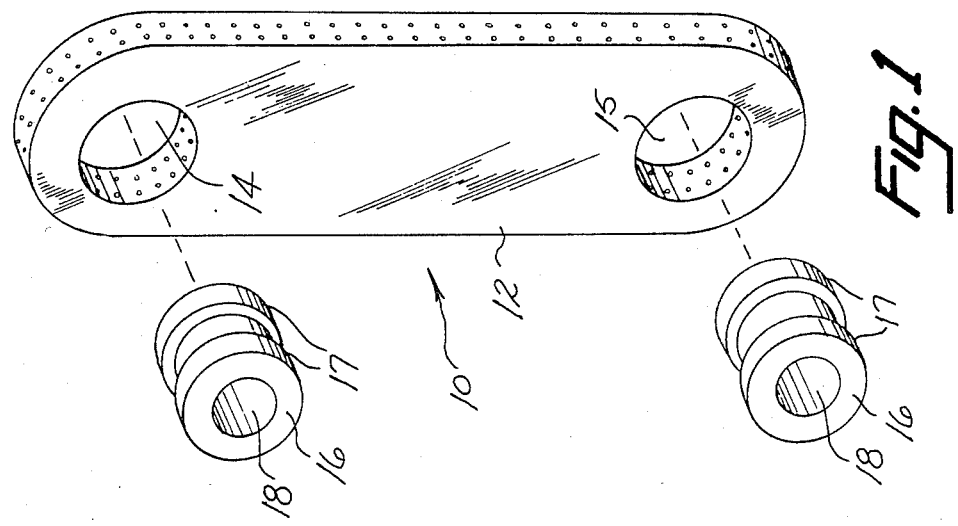

FABRIC REINFORCED RUBBER PRODUCT HAVING MOLDED ISOLATOR BUSHINGS

SUMMARY OF THE INVENTION

This invention relates to an improved elastomeric hanger and will have special application to a vehicle exhaust system hanger.

The hanger of this invention may be adapted for several uses when hanging support is desirable. The hanger includes a body formed of fiber-reinforced rubber or other elastomeric material. One or more openings are defined in the body. An isolator bushing formed of molded rubber or plastic is removably positioned in each body opening and serves to receive an attachment member to secure the hanger to the vehicle body structure and to the system being supported. The advantages of this hanger are strength and durability of the body combined with the flexibility, heat resistance and insulating properties of an elastomeric material.

Accordingly, it is an object of this invention to provide for an improved elastomeric hanger assembly.

Another object of this invention is to provide for a hanger assembly which possesses excellent physical properties.

Another object of this invention is to provide for a hanger assembly which is efficient and economical.

Still another object of this invention is to provide for a hanger assembly which has removable isolator bushings for supporting a vehicle exhaust system.

Still other objects of this invention will become apparent upon reading the following specifications.

BRIEF DESCRIPTION OF THE DRAWINGS

A preferred embodiment of the invention has been chosen to illustrate the principles thereof wherein:

FIG. 1 is an exploded view of the hanger.

FIG. 2 is a longitudinal-sectional view taken of the hanger in assembled form.

DESCRIPTION OF THE PREFERRED EMBODIMENT

Figure 3:
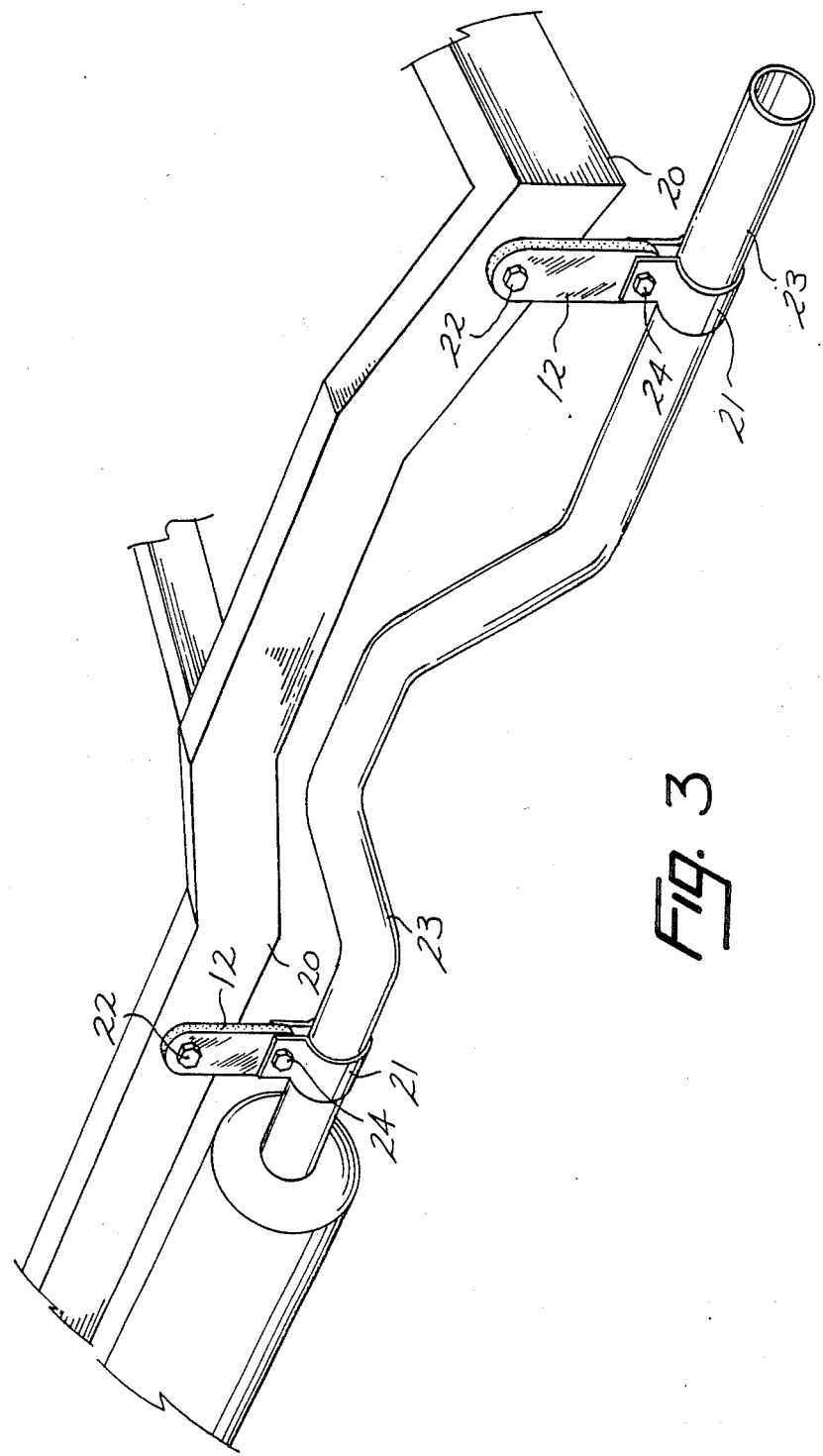
FIG. 3 is a fragmentary perspective view of the hanger in use on a vehicle exhaust system.

The preferred embodiment herein described is not intended to be exhaustive or to limit the invention to the precise form disclosed. It is chosen and described to explain the principles of the invention and its application and practical use to thereby enable others skilled in the art to utilize the invention.

The hanger 10 depicted in the drawings includes a body 12 formed of fiber-reinforced elastomeric material, such as a cut tire carcass. Body 12, as shown, includes openings 14, 15. Altenratively for other uses, body 12 could be formed with only one opening. An isolator bushing 16 preferably formed of molded natural or synthetic rubber, such as EPDM, silicone or other related compounds, is restrictively fitted into each opening 14, 15 and held therein by overlapping flanges 17. Each bushing 16 can be removed or seperated from body 12. Alternatively, bushing 16 may be formed of molded plastic such as polyvinyl chloride, polyvinyl acetate, polyproplylene or polyethylene or other related compounds. Each bushing 16 has an opening 18 formed through it.

FIG. 3 illustrates the hanger 10 as used in a vehicle exhaust system. Two such hangers 10 are suspended from vehicle chassis portion 20. A bolt 20 extends through bushing opening 18 of each hanger and is attached by a nut (not shown) to chassis portion 20. A bolt 24 extends through each clamp 21, which circumscribes the auto exhaust pipe 23, and through the opposite bushing opening 18 of each hanger 10. A nut (not shown) attaches bolt 24 to the clamp and hanger. If the body 12 or bushing 15 of a hanger 10 becomes damaged or wears out, the removable nature of the bushings permits replacement of the damaged part without necessarily replacing the entire hanger assembly.

It is to be understood that the scope of the invention is not limited to the above description, but may be modified within the scope of the appended claims.

We claim:

1. A corrosion-proof hanger for automotive exhaust systems and the like comprising: an elongate strap of fiber-reinforced, cured rubber composition, having spaced-apart, fastener-receiving apertures; and a tubular bushing of molded rubber material snugly mounted in at least one of said apertures, whereby to combine the respective strength, shock-damping, vibration-isolating and heat-insulating properties of said fiber-reinforced cured rubber composition and said molded rubber material.

2. A hanger according to claim 1 wherein said bushing includes spaced, annular end flanges overlying regions of said strap surrounding the aperture in which said bushing is mounted.

* * * * *